(No Model.)

J. L. McKAY.
HARROW.

No. 271,499. Patented Jan. 30, 1883.

WITNESSES:

INVENTOR:
Jno. L. McKay
BY
ATTORNEYS.

N. PETERS, Photo-Lithographer, Washington, D. C.

UNITED STATES PATENT OFFICE.

JOHN L. McKAY, OF FRANKLIN, TENNESSEE.

HARROW.

SPECIFICATION forming part of Letters Patent No. 271,499, dated January 30, 1883.

Application filed June 19, 1882. (No model.)

*To all whom it may concern:*

Be it known that I, JOHN L. MCKAY, of Franklin, in the county of Williamson and State of Tennessee, have invented a new and useful Improvement in Harrows; and I do hereby declare that the following is a full, clear, and exact description of the same, reference being had to the accompanying drawings, forming part of this specification.

This invention relates to improvements in harrows, specially of that class made in sections, and has for its object, among other things, to promote the strength of the individual teeth, to effect the thorough harrowing of the ground, and to adapt the operation of the teeth to the condition of the ground.

The nature of this invention consists in the construction of the teeth each in an approximately V-shaped form, one arm or prong being perpendicular and the other arm or prong inclined, in connection with their attachment and disposition with relation to the beams or bars of the harrow-frame, in rows, the forward arms of one row being connected to one beam of the harrow, and the rear arms of the same row connected to a second beam, to which the forward arms of the succeeding row are connected, while the teeth of one row alternate with the teeth of the adjacent row, substantially as hereinafter more fully set forth.

Figure 1:
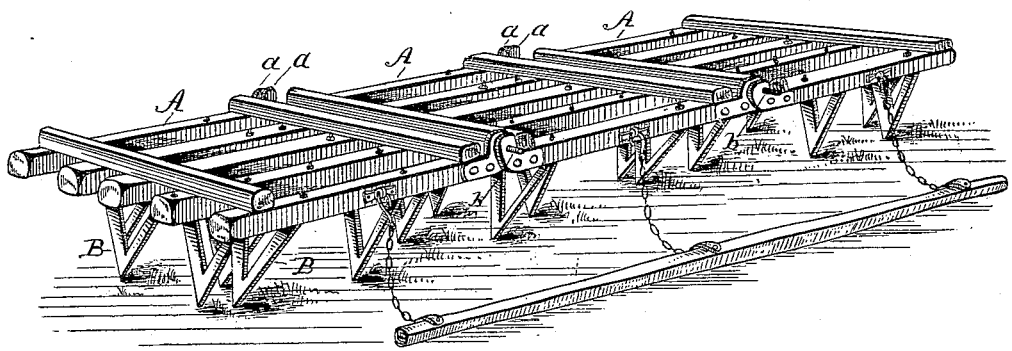
Figure 2:
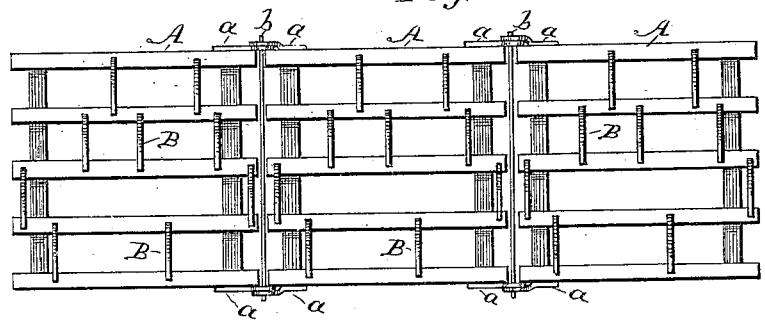
Figure 3:
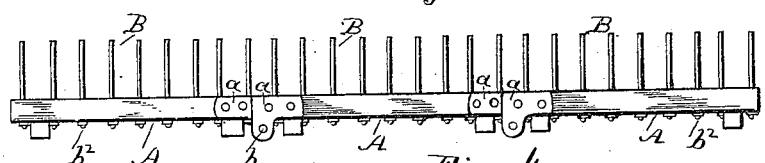
Figure 4:
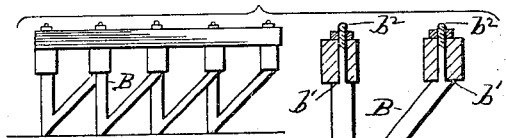

In the accompanying drawings, Figure 1 is a perspective view of my improved harrow. Fig. 2 is an inverted plan view. Fig. 3 is an inverted end view; and Fig. 4 is an end elevation of my improved harrow, with one of its teeth partly in section and in detail.

In carrying out my invention I employ harrow-sections A A, the two being detachably connected together, and so as to have independent movement of each other in moving over hilly or uneven ground. The means for connecting the sections may consist of apertured or perforated hook-shaped plates $a$ $a$, affixed to the front and rear sides of the sections and projecting beyond their ends, the plates $a$ of one section fitting side by side with those of the other section. It consists, further, preferably, of a rod or pins $b$, passed through the apertures or perforations of said plates. These sections are provided on their under side with harrow-teeth B B, arranged in rows, the teeth of the succeeding rows alternating with those of the preceding rows. The arms of each tooth are provided with shoulders or flanges $b'$, having upwardly-projecting bolts or screw-threaded rods $b^2$, which pass through and are nutted upon the upper side of the beams of the harrow-sections to brace and fasten the teeth to said cross-bars. This arrangement of the teeth causes the thorough harrowing or pulverizing of the plowed ground, as that failed to be acted on by the preceding row of teeth is acted on by the following rows of teeth. The individual construction of these teeth is that of an approximately V-shape form—that is to say, one arm or prong made to stand perpendicularly to the surface of the ground and the other arm or prong inclined upwardly from the lower end of the vertical arm, as shown particularly in Fig. 4. The divergent or upper ends of the teeth are fastened to cross bars or beams of the harrow-section frames. The forward arms or prongs of one row are fastened to one cross-beam, and the rear arms or prongs thereof are fastened to a second cross bar or beam, to which are fastened the forward arms or prongs of a succeeding row of teeth, but out of line or alternating therewith, while the rear arms of this latter row are fastened to a third cross bar or beam out of line or alternating with the row whose forward arms are attached to said third cross-bar. This method of fastening the rows of teeth in place is observed throughout the harrow-sections, resulting in the arrangement above ascribed to the teeth. The teeth are beveled or rounded on their front and rear edges.

Means are provided for the hitching of the team to either side of the connected harrow-sections by the employment of whiffletrees and chains hooked in eyes or clips on the said sections, or the use of other suitable means.

It is preferable to use the machine with the inclined surfaces of the teeth presented toward the line of draft in working or harrowing uncleared ground. Otherwise the machine is used with the perpendicular surfaces of the teeth presented toward the line of draft.

Having thus described my invention, what I claim as new is—

In a harrow, the combination, with the beams A of its frame, of the rows of approximately V-shaped teeth B, having the vertical bolts $b'$ and the nuts $b^2$, the forward arms of one row being connected to one beam, and the rear arms of the same row connected to the second beam, to which the forward arms of the succeeding row are connected, while the teeth of one row alternate with the teeth of the adjoining row of teeth, substantially as shown and described, and for the purpose set forth.

JOHN LUTHER McKAY.

Witnesses:
F. E. McKAY,
R. H. McKAY.